Jan. 28, 1941.　　　　E. W. WHITE　　　　2,229,830
NONSKID APPARATUS FOR TRACTION WHEELS
Filed Nov. 8, 1938　　　4 Sheets-Sheet 3
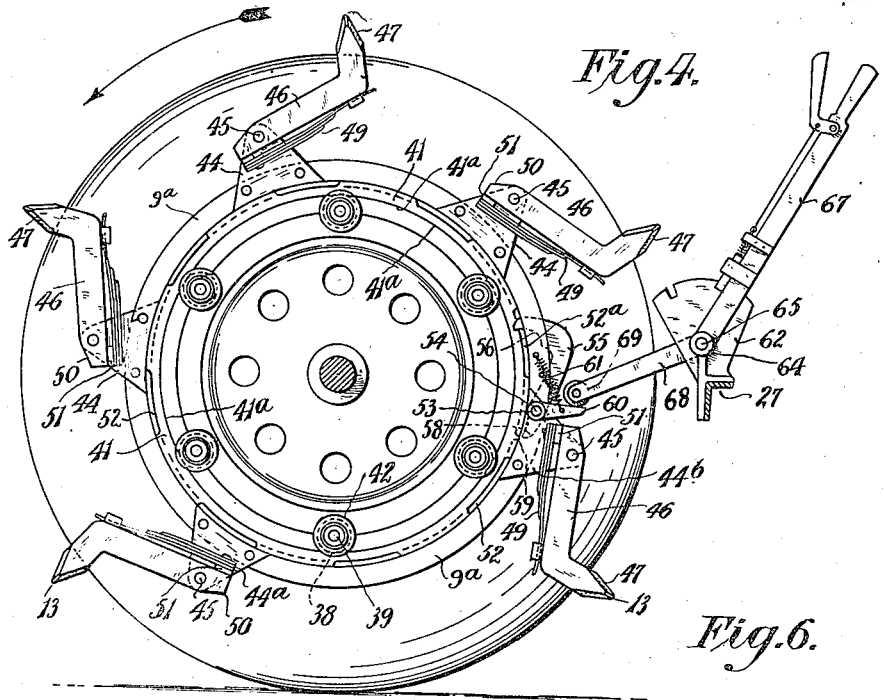
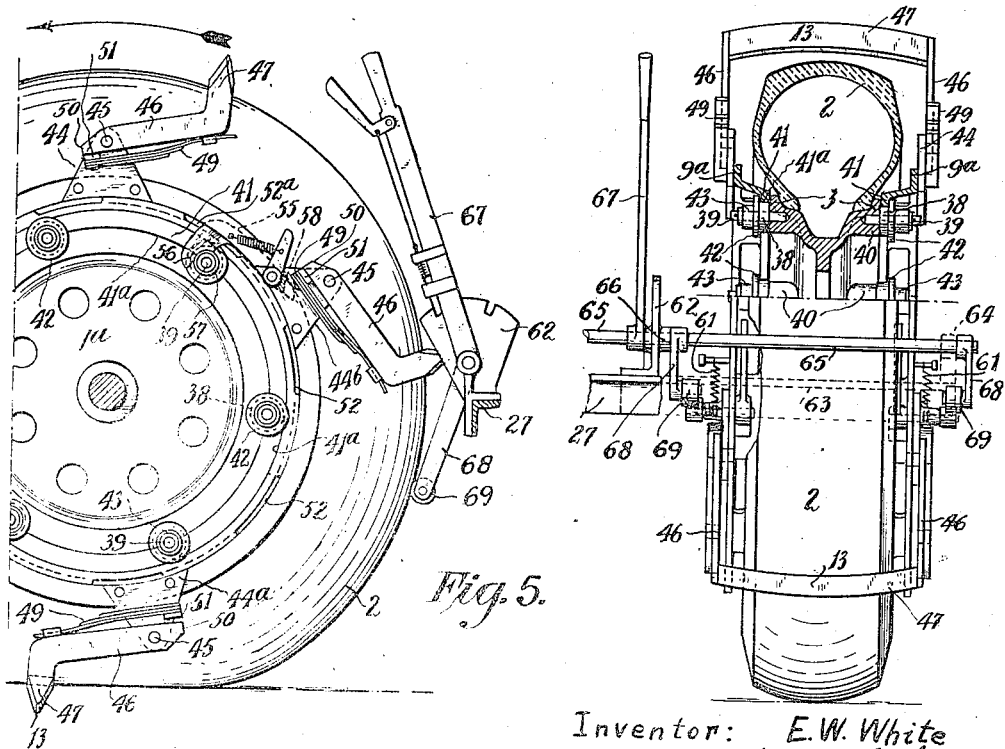
Inventor: E. W. White
By John A. Seifert
Attorney Jan. 28, 1941.  E. W. WHITE  2,229,830
NONSKID APPARATUS FOR TRACTION WHEELS
Filed Nov. 8, 1938  4 Sheets-Sheet 4

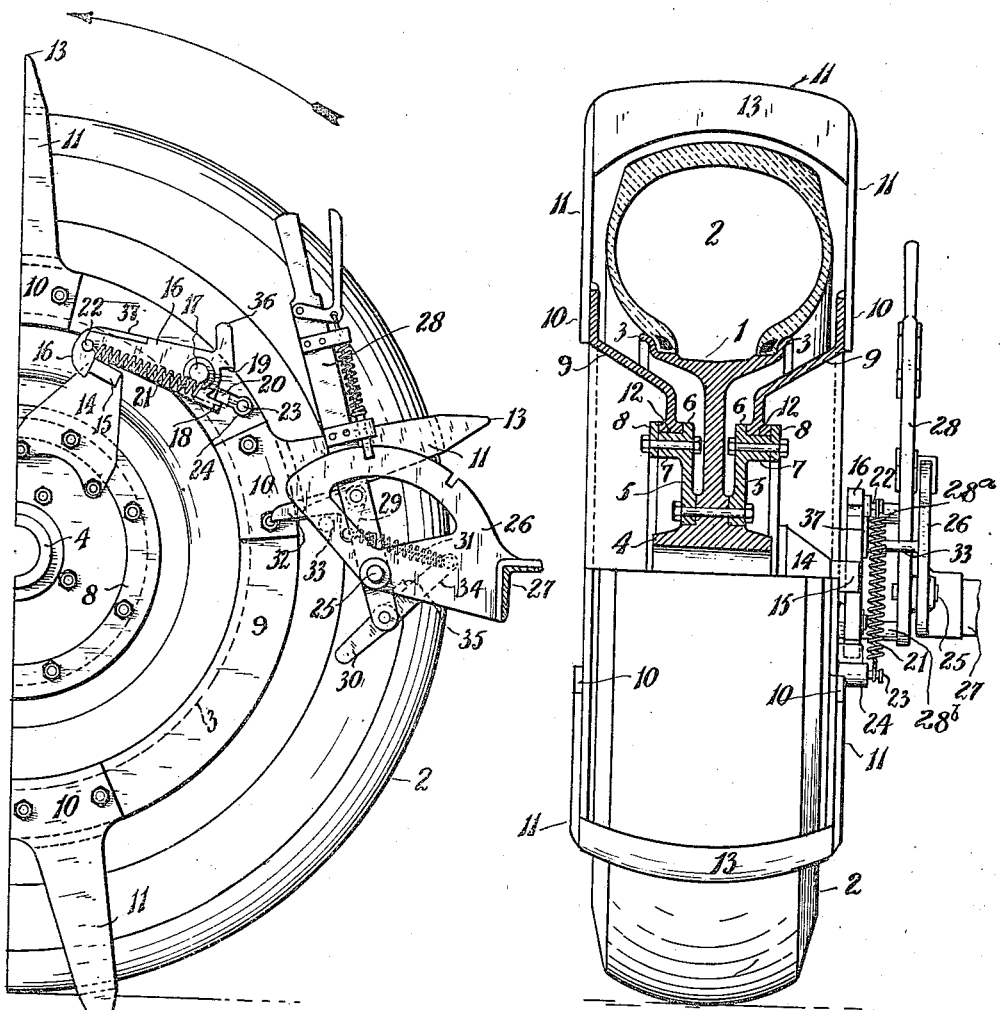

Inventor
E. W. White
John A. Seifert
Attorney

Patented Jan. 28, 1941

2,229,830

UNITED STATES PATENT OFFICE 2,229,830

NONSKID APPARATUS FOR TRACTION WHEELS

Eric William White, Nine Mile, Victoria, Australia

Application November 8, 1938, Serial No. 239,500
In Australia November 16, 1937

13 Claims. (Cl. 301—47)

This invention relates to traction wheels of motive vehicles, such as tractors used for haulage purposes, and it has special reference to nonskid means or apparatus associated with the traction wheels and capable of rotation with the same when soft ground is to be traversed.

It has recently become the practice to equip the wheels of tractors and like motive vehicles with pneumatic tyres. Such tyres have proved very satisfactory for road travel and are also efficient for land transport and tillage when used on dry or firm ground. Pneumatic tyres are however incapable of securing a firm grip or hold on soft and wet soil or friable ground even though the treads or peripheries be formed with tractive bars or ribs. Under such unfavourable conditions of soil, skidding of the tyres is apt to occur, the wheels sink into the soft ground and the tractor becomes incapable of motion.

In the operation of a tractor, particularly in the cultivation of land, soft yieldable patches or mud surfaces are encountered which are usually isolated and of relatively limited extent and are separated by intervening stretches of normal soil. In traversing land surfaces such as mentioned, the use of nonskid means or apparatus may be indispensable to enable the isolated mud patches to be negotiated but may be quite unnecessary when the tractor is passing over the intervening stretches of normal soil.

With the above stated considerations in view, it is an obvious requirement that nonskid means or apparatus for the wheels of a tractor should be maintained inoperative when the tractor is traversing firm ground and the nonskid means or apparatus should be capable of being quickly set in action when a mud patch is met with and rendered inoperative with like facility when the mud patch is negotiated, preferably without stopping the tractor and under the control of an operative from the driving position.

It is an object of the present invention to meet this requirement by the provision of nonskid means or apparatus rotatably supported upon the driving wheels of a tractor and normally held against rotation in inoperative position, while the driving wheels rotate, but adapted under the control of an operative for releasement from the inoperative position and operative connection with the driving wheels to rotate with the same when the tractor is about to pass over soft and wet soil, and further adapted under the control of the operative to be disconnected from the driving wheels and to be brought to rest in the inoperative position when travel of the tractor over the soft and wet soil has terminated.

Another object of the invention is to provide nonskid means or apparatus as above indicated, having pluralities of soil-gripping elements adapted when the nonskid means or apparatus is set in action to rotate in unison with the driving wheels and penetrate the soil in sequence but which in the inoperative position are clear of the soil, the lowermost gripping elements positioned at the leading and trailing sides of the driving wheels being then located at a predetermined elevation above the ground level. The gripping elements are secured in spaced positions to supporting means rotatably mounted on the driving wheels and normally held against rotation but capable of releasable connection with the driving wheels to cause the gripping elements to rotate with the same, and provide the necessary hold upon the soil.

A further object of the invention is to provide transversely disposed gripping elements which extend over or span the pneumatic tyres on the driving wheels and are secured to supporting means rotatably mounted on opposite sides of the driving wheels and adapted to be maintained stationary or to be releasably connected with the driving wheels to revolve therewith as above indicated. The transversely disposed gripping elements may be rigidly secured to the supporting means and may be separated from the peripheral surfaces of the pneumatic tyres by clearance spaces both when the apparatus is inoperative or in action. Preferably, however the transversely disposed gripping elements are movably connected with the supporting means and are normally maintained clear of the tyres by resilient means and limiting abutments, the movable connection of the transversely disposed gripping elements with the supporting means being such that the said gripping elements on penetrating the soil beneath the tyres contact with the same and follow their deflection and on leaving the soil are restored to the normal position by the resilient means and the movement of the tyres in returning to the normal shape.

Yet another object of the invention resides in the provision of releasable coupling means whereby a positive driving connection of the supporting means carrying the gripping elements with the driving wheels is effected and of control means actuated by the driver of the tractor and adapted to govern the actions of the releasable coupling means and to hold the supporting means in and to release the same from the inoperative position.

the operation of the control means and of the releasable coupling means being such that the driver is able to set the gripping elements in and out of action while the tractor continues in motion.

The invention will be better understood from the description of the embodiments of the same illustrated in the accompanying drawings wherein:

Figure 2 is a part side elevation of the tractor wheel and nonskid apparatus illustrated in Figure 1, the latter being shown in operation.

Figure 3 is a view partly in elevation and partly in section on the line 3—3 in Figure 1.

Figure 4 is a side elevation of a tractor wheel and nonskid apparatus according to the invention, the latter being modified in detail and shown in inoperative position.

Figure 5 is a part side elevation of the tractor wheel and nonskid apparatus illustrated in Figure 4, the latter being shown in operation.

Figure 6 is a view partly in elevation and partly in section as seen from the rear or trailing side of Figure 4.

Figure 1:
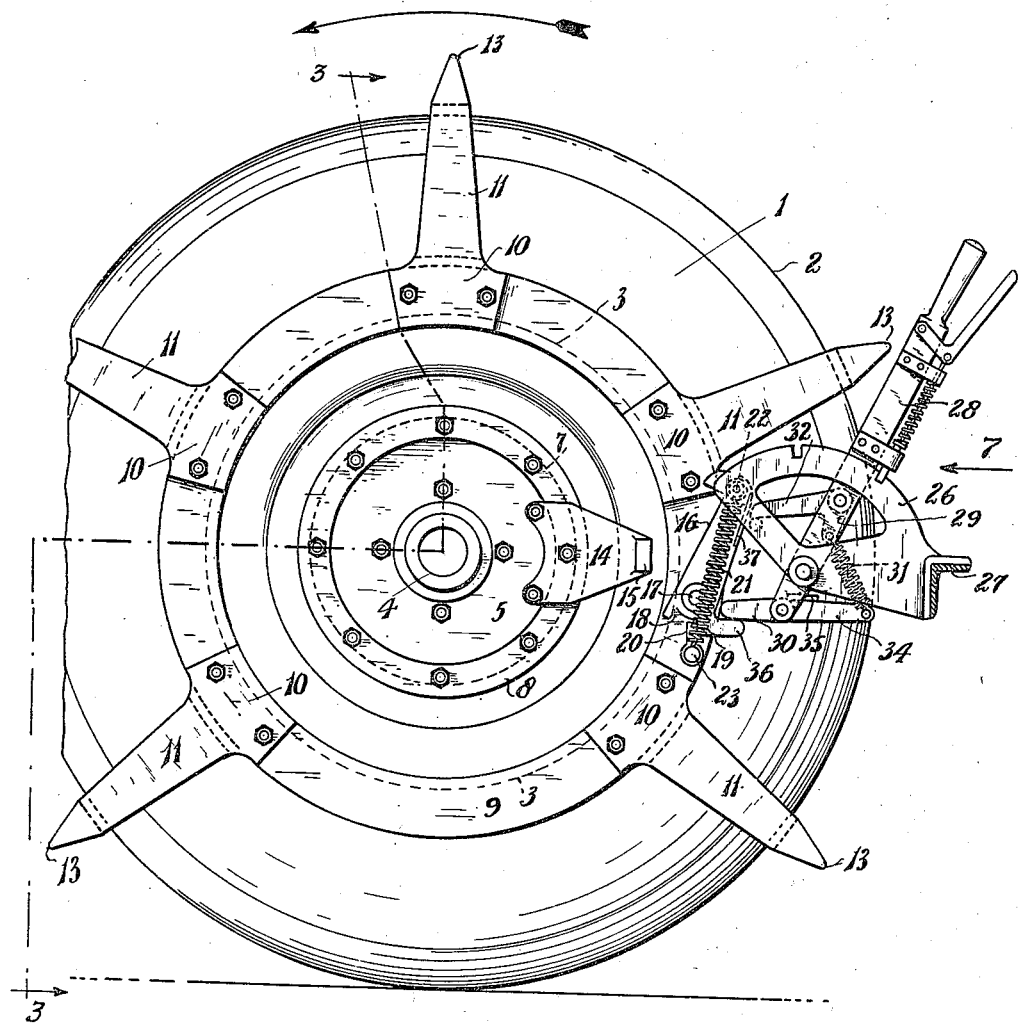
Figure 1 is a side elevation of a tractor wheel and nonskid apparatus in accordance with the invention, the latter being shown in inoperative position.
Figure 7:
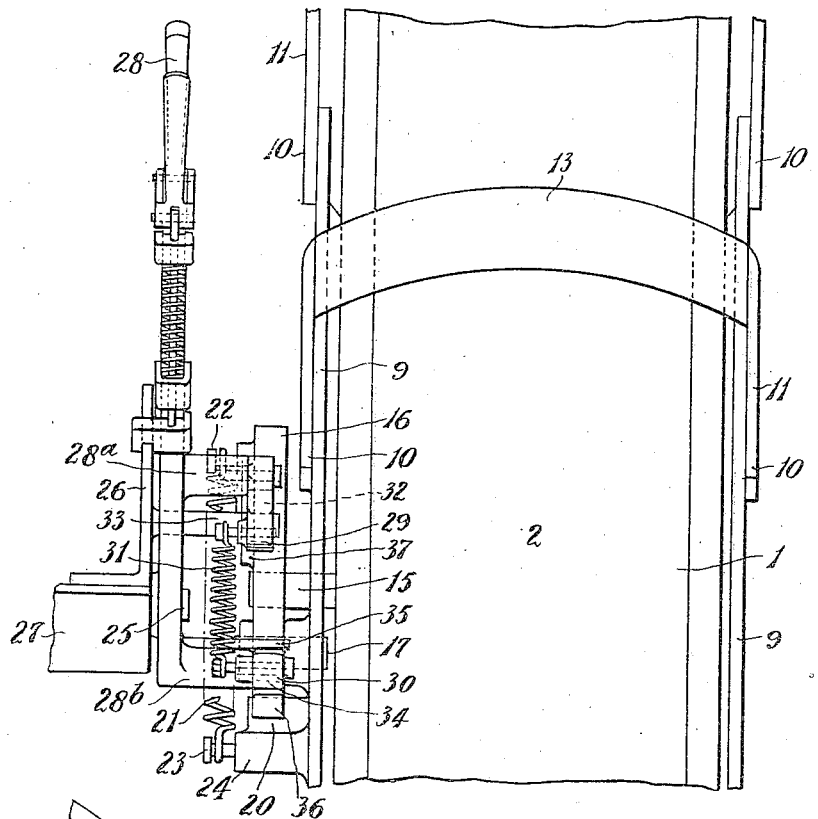
Figure 7 is an elevational view, on an enlarged scale, of a portion of the tractor wheel and nonskid apparatus as viewed in the direction indicated by the arrow 7 in Figure 1.
Figure 8:
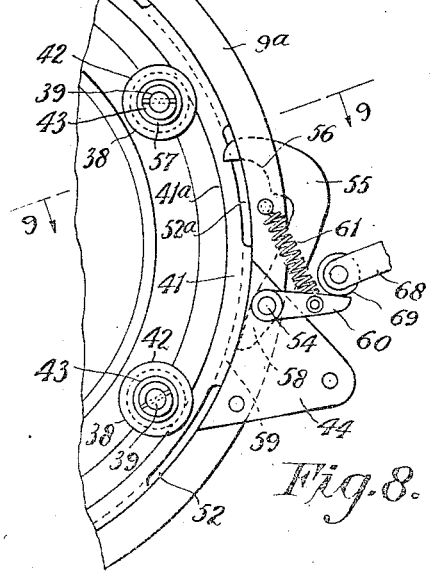
Figure 8 is an elevational view of a portion of Figure 4, on an enlarged scale.
Figure 9:
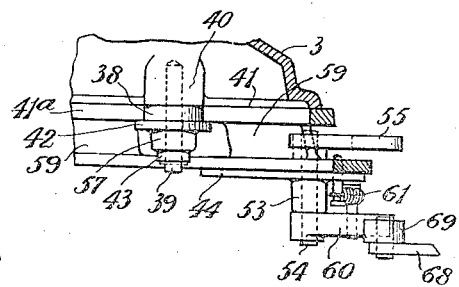
Figure 9 is a sectional view taken on the line 9—9 of Figure 8, looking in the direction of the arrows.

Referring in the first instance to Figures 1, 2, 3 and 7, the numeral 1 indicates a traction wheel of a tractor or like motive vehicle, and 2 a pneumatic tire mounted upon the rim 3 of the traction wheel 1 in customary manner. Seated upon the hub or nave 4 and bolted to the wheel 1 are discal members 5 having radial flanges 6 and circular flanges 7, the outer peripheries of the latter flanges being of the same diameter and concentrically disposed about the axis of the wheel 1. Mounted upon the circular flanges 7 and retained thereon by detachable plates 8 are annular supporting members or frames 9 to which are secured the opposite ends 10 of spaced yokes 11 spanning or extending transversely over the pneumatic tire 2 but separated from the same by an appropriate clearance space or interval, as shown.

The flanges 6 and 7 and the detachable plates 8 form channelled bearings 12 whereon the annular frames 9 are free to rotate, and it will be understood that the frames 9 together with the yokes 11 may be rotated as a whole or unit upon the circular flanges 7. Moreover, it will be understood that the frames 9 and yokes 11 may be held against rotation while the wheel 1 and tire 2 revolve and the circular flanges 7 rotate within the stationary frames 9. Furthermore, it will be clear that if the unitary frames 9 and yokes 11 be set free to rotate and be mechanically connected with the wheel 1, the said frames and yokes will rotate in unison with the wheel and the yokes will secure in sequence a firm hold or grip upon the soil to maintain the draft.

The thread portions of the yokes 11 extending transversely across the periphery of the pneumatic tire 2 comprise gripping elements 13 which penetrate and grip the soil, and the gripping elements may be pointed and made of triangular section, as shown, or otherwise shaped to readily enter and leave the ground surface.

When the wheel 1 is passing over normal soil and use of the gripping elements is not required, the frames 9 and the yokes 11 are held stationary against rotation in inoperative position, as hereinafter described, while the wheel 1 revolves within the yokes but clear of the same.

In the inoperative position, two of the yokes 11 occupy lowermost positions at the leading and trailing sides of the wheel 1, and the gripping elements 13 on the two lowermost yokes are maintained at predetermined elevations clear of the ground surface. The yokes 11 may be spaced evenly apart, but the said lowermost yokes are generally more widely separated, as shown, to provide the necessary ground clearance.

To operatively connect the frames 9 and yokes 11 with the wheel 1, there is secured to the latter a plate 14 having thereon a catch 15 adapted for engagement by a pawl or hooked member 16 pivoted on a pin 17 secured in one of the frames 9.

The motion of the pawl 16 is limited by abutments 18 and 19 thereon which by contact with a stop 20 on the frame 9 determine respectively the position of the pawl 16 for engagement with the catch 15 and the released or inoperative position of the said pawl. An overcentering spring 21 connected at opposite ends to pins 22 and 23 fixed respectively in the pawl 16 and in a boss 24 on the frame 9 maintains the pawl in the engaging position and assists in returning and maintaining the same in the released position.

Pivoted on a shaft 25 fixed in a frame 26 secured to the framing 27 of the tractor is a control lever 28 on which are pivotally supported upon bosses 28a and 28b integral with said lever, a bellcrank lever 29 and a straight armed lever 30. The levers 29 and 30 are interconnected by a spring 31 under the tension of which the arm 32 of the former lever is maintained in contact with a pin 33 fixed in and projecting from the frame 26, and the arm 34 of the latter lever is normally held in contact with a stop 35 secured to the control lever 28.

Projecting from the pawl 16 is an arm 36 which in the inoperative position, see Figure 1, engages the lever 30 which forms a stop whereby the pawl 16 is held in the released position with the abutment 19 in contact with the stop 20. Moreover, the stop lever 30 by contact with the arm 36 holds the frame 9 together with the yokes 11 and the opposed frame 9 in stationary inoperative position against rotation while the wheel 1 revolves within and clear of the yokes in travelling over the ground surface.

When a mud patch is approached and it becomes necessary to utilise the gripping elements 13, the driver moves the control lever 28 from the position shown in Figure 1 to the position indicated in Figure 2. This movement of the lever 28 withdraws the stop lever 30 from the arm 36 and simultaneously thrusts the arm 32 of the bellcrank lever 29 into contact with the pawl 16 which is somewhat widened by a laterally projecting lug 37 to ensure contact of the end of the arm 32 with said pawl, see Figure 7. The pawl 16 is thus impelled towards the position for engagement with the catch 15, final movement of the pawl into the engaging position being effected by the overcentering of the spring 21.

When the frames 9 and the yokes 11 have been thus released from restraint and the catch 15 engages the pawl 16, the frames and yokes will be rotated synchronously with the wheel 1 and the gripping elements 13 will provide the necessary hold upon the soil until the mud patch has been negotiated.

Upon clearing the mud patch, the driver returns the control lever to the position shown in Figure 1 thereby imposing the stop lever 30 in the course of the arm 36, which when thus impeded causes the pawl 16 to rotate upon the pivot 17 and become disengaged from the revolving catch 15. Moreover, upon disengagement of the catch 15 and pawl 16, the arm 36 by contact with the stop lever 30 arrests the frames 9 and yokes 11 and maintains the same again in the inoperative position shown in Figure 1. Furthermore, the stop lever 30 in arresting the motion of the frames 9 and yokes 11 is rotated somewhat from the stop 35 in opposition to the spring 31 which thus absorbs shock or jar in stopping rotation of the frames and yokes.

Referring now more particularly to Figures 4, 5, 6, 8 and 9, it will be seen that frames 9a are mounted upon rollers 38 which are free to rotate on pins 39 secured in and projecting from bosses 40 on opposite sides of traction wheel 1a. The pins 39 and accordingly the rollers 38 thereon are evenly spaced apart and are disposed at equal radial distances from the axis of the wheel. The rollers 38 are of equal diameter and fit freely within races 41 on the interiors of the frames 9a which are carried upon the rollers 38 and disposed concentrically by the same about the axis of the wheel 1a.

It will be understood that when the frames 9a are maintained stationary against rotation as herein described, the rollers 38 will travel in a circular orbit as the wheel 1a revolves and the said rollers will roll around the endless circular tracks 41a formed by the interiors of the races 41.

The sides of the races 41 are formed flatly to fit between flanges 42 on the rollers 38 and the bosses 40, and as the rollers 38 are retained on the pins 39 by collars 43 it will be understood that the frames 9a are secured against endwise displacement from the wheel 1a.

Fixed to the frames 9a are brackets 44 in which are secured projecting pins 45 forming pivotal supports for tangentially disposed arms 46 which extend from the pins 45 in direction opposed to the direction of rotation of the wheel 1a and the pneumatic tire 2 thereon.

To the rearward ends of arms 46 on opposite sides of the tire 2 are integrally united yokes 47 which span the tire 2 and are provided with soil-gripping elements 13 constructed as previously described and extending across the tread of the tire. The brackets 44 are similarly spaced upon the oppositely positioned frames 9a and the yokes 47 and the arms 46 maintain the opposed brackets 44 in radial alignment.

Springs 49 secured to the brackets 44 and bearing upon the arms 46 thrust the same in outward radial directions and maintain the gripping elements 13 clear of the periphery or tread 48 of the tire 2, a clearance, see Figure 6, between the gripping elements and the tread 48 being limited by contact of extensions 50 of the arms 46 with stops or abutments 51 on the brackets 44.

The brackets indicated by 44a and 44b carrying the yokes 47 and gripping elements 13 which are lowermost in the inoperative position, see Figure 4, are secured to the frames 9a in such positions that the lowermost gripping elements are maintained at predetermined elevations above the ground surface. The remaining brackets 44 are spaced at equal circumferential distances between the brackets 44a and 44b, and the gripping elements 13 thereon are spaced at correspondingly equal intervals apart.

The frames 9a may be lightened by spaced apertures 52, and the said frames are provided in required positions with outstanding bosses 53 which form bearings for shafts 54 which extend inwardly through the frames 9a and project outwardly from the bosses 53. Secured to the inner ends of the shafts 54 are hooked pawls 55, which are adapted to project inwardly through apertures 52a, and the ends of the pawls 55 are shaped as at 56 for engagement with the portions 57 of the rollers 38 situated at the outer sides of the flanges 42. The hooked pawls 55 are provided with extensions 58 which by contact with the webs 59 of the frames 9a limit the outward movements of the said pawls, see Figure 8.

Fixed to the outer ends of the shafts 54 are arms 60 to which are secured springs 61 the opposite ends of which are connected to the frames 9a. It will be apparent that the springs 61 by action on the arms 60 tend to rotate the shafts 54 to throw the hooked pawls 55 inwardly through the apertures 52a for engagement with the rollers 38.

Mounted on the framing 27 of the tractor is a bracket 62 and mounted on an extension 63, indicated by broken lines in Figure 6, of the framing 27 is a bearing 64 which supports the outer end of a shaft 65. The shaft 65 passes through a bearing 66 in the bracket 62, and to the shaft 65 is secured a control lever 67 and arms 68 upon which are mounted rollers 69.

It will be apparent that the rollers 38 in rolling around the circular tracks 41a will tend to rotate the frames 9a and the yokes 47 and gripping elements 13 in the direction of rotation of the wheel 1a, and that the shafts 54, hooked pawls 55 and arms 60 will revolve with the frames 9a.

If now stops such as the rollers 69 be imposed in the circular courses of the arms 60, it will be understood that the latter will be moved in opposition to the springs 61 to partially rotate the shafts 54 and thereby move the hooked pawls 55 into the released positions wherein the pawl extensions 58 contact with the webs 59 of the frames 9a and lock the pawls 55 against further movement. Moreover, it will be understood that the hooked pawls 55 being secured to shafts 54 will prevent further movement of the same and of the arms 60 which become rigid with the frames 9a and hold the same and the yokes 47 and gripping elements 13 against rotation in the inoperative position shown in Figure 4.

In practice, the frames 9a and the gripping elements are maintained in the inoperative position when normal soil is being traversed by the wheel 1a and the tire 2 which revolves within the arms 46 and yokes 47 but clear of the same.

When a mud patch is met with, the driver operates the control lever 67 to partially rotate the shaft 65 and arms 68 to withdraw the rollers 69 from the arms 60 into the disengaged position shown in Figure 5, whereupon the springs 61 impel the hooked pawls 55 inwardly through the apertures 52a, the inward movement of the pawls 55 being limited by contact of said pawls with the webs 59.

The pawls 55, when thus positioned, become engaged with coaxially aligned rollers 38 on opposite sides of the wheel 1a, and through the medium of the pins 39, rollers 38, pawls 55 and shafts 54, the frames 9a and consequently the gripping elements 13 become positively connected with the wheel 1a to rotate with the same, so that the gripping elements 13 provide the necessary hold upon the soil to enable the mud patch to be traversed.

The tire 2 in passing over the soil deflects considerably, see Figure 5, and on penetrating the soil the gripping elements 13 contact with the tire 2 and by reason of the pivotal support follow the deflection of said tire in opposition to the springs 49, the extensions 50 of the arms 46 being displaced from the stops or abutments 51. Moreover, as the gripping elements 13 remain in contact with the tire 2, the weight carried by the latter is not imposed upon the brackets 44 and the frames 9ª. As the gripping elements 13 emerge from the soil, the springs 49 restore the former to the normal position clear of the tread 48 of the tire 2.

When the mud patch has been negotiated, the driver actuates the control lever 67 to position the rollers 69 in the way of the revolving arms 60 which by contact with said rollers are operated to disengage the hooked pawls 55 from the rollers 38 and arrest the motion of the frames 9ª and retain the same in the inoperative position, as previously described.

In the foregoing the invention has been described with reference to a single traction wheel, but in practice similar apparatus would be utilised on both traction wheels of a tractor. Moreover, the apparatus on each wheel may be operated independently by separate control levers, or a single control lever may be utilised to operate the similar apparatus on the two wheels.

What I do claim is:

1. Nonskid apparatus for a traction wheel, comprising supporting means rotatably mounted on the traction wheel, a plurality of soil-gripping elements mounted on the supporting means in spaced position, a driving element secured to and projecting from the traction wheel, coupling means on the supporting means engageable with the driving element to positively couple the supporting means with the traction wheel, adjustable stop means mounted in stationary position and releasably engageable with the coupling means to arrest rotary movement of and hold the supporting means and the gripping elements inoperative against rotation and to maintain the coupling means in inactive position, and means for impelling the coupling means after release of the same by the adjustable stop means into active position for engagement with the driving element.

2. Nonskid apparatus for a traction wheel fitted with a pneumatic tire, comprising a support rotatably mounted upon the traction wheel on each side of said wheel, transversely disposed soil-gripping members spanning the pneumatic tire in spaced positions and movably connected to the oppositely positioned supports to form a rotary unit consisting of said supports and members rotatable on and independently of the traction wheel, a plurality of spaced driving elements secured to each side of and projecting from the traction wheel, coupling members mounted on the supports and engageable with the driving elements to positively couple the rotary unit with the traction wheel to rotate with said wheel, adjustable stops mounted in stationary positions at opposite sides of the traction wheel and releasably engageable with the coupling members to disengage the same from the driving elements and arrest rotation of the rotary unit, and resilient means associated with the coupling members and adapted to impel the same into positions for engagement with the driving elements on release of said coupling members by the adjustable stops.

3. In combination with the nonskid apparatus claimed in claim 2, coaxially aligned pivots on the oppositely positioned supports, and arms forming extensions of the transversely disposed members pivotally supported on the coaxially aligned pivots.

4. Nonskid apparatus for a traction wheel fitted with a pneumatic tire, comprising similar discal members positioned on opposite sides of and fixed to the traction wheel, similar annular frames rotatably mounted on the peripheries of the discal members, means for retaining the annular frames on the discal members, yokes spanning the pneumatic tire in spaced positions and secured at opposite ends to the oppositely positioned annular frames, the transverse portions of the yokes forming soil-gripping elements extending over and clear of the periphery of the pneumatic tire, a catch secured to and projecting from the traction wheel, a coupling member on one of the annular frames engageable with the catch to positively couple both annular frames and the yokes with the traction wheel to rotate with said wheel, an adjustable stop mounted in stationary position and engageable with the coupling member to disengage said member from the catch and hold the annular frames and yokes stationary against rotation, and control means for governing the actions of the adjustable stop and the coupling member.

5. Nonskid apparatus for a traction wheel fitted with a pneumatic tire, comprising a discal member positioned on each side of and fixed to the traction wheel, a bearing on each discal member concentric with the axis of the traction wheel, an annular frame rotatably mounted on each bearing, yokes spanning the pneumatic tire in circumferentially spaced positions, side members on the yokes secured to the oppositely positioned annular frames, transverse portions of the yokes connecting the side members and shaped to form soil-gripping elements extending over and clear of the tire, a driving element on the traction wheel, a coupling member pivoted on one of the annular frames and engageable with the driving element, means for positioning the coupling member in operative and inoperative positions, a control lever pivotally supported in stationary position, means on the control lever to actuate the coupling member from the inoperative to the operative position, and a stop carried by the control lever to engage and actuate the coupling member from the operative to the inoperative position.

6. Nonskid apparatus for a traction wheel fitted with a pneumatic tire, comprising a plurality of roller supports mounted on each side of the traction wheel in spaced positions and disposed concentrically about the axis of said wheel, an annular member at each side of the traction wheel mounted on the roller supports, yokes spanning the pneumatic tire in circumferentially spaced positions and pivotally connected to the oppositely positioned annular members, transverse portions of the yokes extending over the periphery of the pneumatic tire and shaped to form soil-gripping elements, resilient means for maintaining the soil-gripping elements clear of the surface of the pneumatic tire, means for limiting the clearance between the soil-gripping elements and said tire, driving means on each side of the traction wheel, coupling means on each annular member engageable with said driving means, adjustable stop means mounted in stationary position and releasably engageable with the coupling means, and control means governing the actions of the adjustable stop means and the coupling means.

7. Nonskid apparatus for a traction wheel fitted with a pneumatic tire, comprising coaxially aligned supports on opposite sides of the traction wheel disposed in spaced positions and concentrically about the axis of said wheel, rollers rotatably mounted on the coaxially aligned supports, means for retaining the rollers on said supports, an annular frame at each side of the traction wheel mounted on the corresponding rollers, peripherally spaced apertures in the annular frames, races on the annular frames engaging the rollers, collars on the rollers in contact with the races, yokes spanning the pneumatic tire in circumferentially spaced positions, radially aligned brackets on the annular frames, tangentially disposed arms forming extensions of the yokes and pivoted on the brackets, soil-gripping elements on the yokes extending across and clear of the periphery of the pneumatic tire, springs bearing on the tangentially disposed arms to displace the soil-gripping elements outwardly from the tire, stops opposing the outward movement of the soil-gripping elements to limit the clearance between the soil-gripping elements and the surface of the tire, coaxially aligned shafts in the oppositely positioned frames, coupling members fixed to the coaxially aligned shafts and movable through aligned apertures in said frames, arms fixed to the coaxially aligned shafts, resilient means connected to the arms to actuate the coupling members through the aligned apertures for engagement with said rollers, a control lever mounted in stationary position, an operating shaft actuated by the control lever, and stops mounted on the operating shaft and engageable with said arms to release the coupling members from the rollers and maintain the annular frames and the yokes in inoperative position.

8. In nonskid apparatus for a traction wheel fitted with a pneumatic tire, a soil-gripping member extending across the periphery of the pneumatic tire and pivotally mounted to have movement toward and away from the tire and rotatably mounted to have movement in a circular path concentrically of the axis of rotation of the wheel and independently of the rotation of the wheel and tire, resilient means bearing on the soil-gripping member to urge the soil-gripping element outwardly from the tire, and stop means opposing the resilient means to limit the clearance between the soil-gripping element and the periphery of the tire.

9. In nonskid apparatus for a traction wheel fitted with a pneumatic tire, the combination of a transverse member spanning and movable relatively to the pneumatic tire, a soil-gripping element on the transverse member extending across the periphery of the pneumatic tire, tangentially disposed arms forming extensions of the transverse member pivotally supported on opposite sides of the pneumatic tire and rotatably supported to have movement in a circular path concentrically of the axis of the wheel and independently of the rotation of the wheel and tire, springs bearing on the tangentially disposed arms to urge the soil-gripping element outwardly from the tire, and stops opposing the springs and restricting the movement of said arms to limit the clearance between the soil-gripping element and the periphery of the tire.

10. Nonskid apparatus for a traction wheel fitted with a pneumatic tire, comprising a support rotatably mounted upon the traction wheel on each side of said wheel, transversely disposed soil-gripping members spanning the pneumatic tire in spaced positions and connected to the oppositely positioned supports to form a rotary unit consisting of said supports and members rotatable on and independently of the traction wheel, a driving element secured to and projecting from the traction wheel, coupling means on one of the supports engageable with the driving element to positively couple the rotary unit with the traction wheel to rotate with said wheel, adjustable stop means mounted in stationary position and releasably engageable with the coupling means to disengage the same from the driving element and arrest rotation of the rotary unit, and means for impelling the coupling means into active position for engagement with the driving element.

11. Nonskid apparatus for a traction wheel fitted with a pneumatic tire, comprising a concentric support fixed to each side of the traction wheel, an annular member rotatably mounted on each concentric support, yokes spanning the pneumatic tire and secured to the annular members in spaced positions, soil-gripping members on the yokes extending across and clear of the pneumatic tire, a driving element secured to and projecting from the traction wheel, a coupling member pivotally mounted on one of the supports and engageable with the driving element to positively couple the supports and yokes with the traction wheel to rotate with said wheel, an adjustable stop mounted in stationary position and releasable engageable with the coupling member to disengage the same from the driving element and arrest rotation of the supports and yokes, and control means governing the actions of the adjustable stop and the coupling member.

12. Nonskid apparatus for a traction wheel fitted with a pneumatic tire, comprising a plurality of spaced rotary supports secured concentrically to the traction wheel on each side of said wheel, similar rigid annular frames mounted on opposite sides of the traction wheel upon the concentric rotary supports, transversely disposed soil-gripping members spanning the pneumatic tire in spaced positions and movably connected to the oppositely positioned annular frames to form a rotary unit consisting of said transversely disposed members and annular frames rotatable on the concentric rotary supports independently of the traction wheel, coupling members pivotally mounted on the annular frames and engageable with the concentric rotary supports to positively couple the rotary unit with the traction wheel to rotate with said wheel, adjustable stops mounted in stationary positions at opposite sides of the traction wheel and releasably engageable with the coupling members to disengage the same from the concentric rotary supports to arrest rotation of and maintain stationary the rotary unit, resilient means associated with the coupling members and adapted to impel the same into positions for engagement with the concentric rotary supports on release of said coupling members by the adjustable stops, and control means governing the actions of the adjustable stops and the coupling members.

13. Nonskid apparatus for a traction wheel fitted with a pneumatic tire, comprising supporting means rotatably mounted on the traction wheel, a plurality of soil-gripping elements pivotally connected to the supporting means in circumferentially spaced positions and extending transversely over the periphery of the pneumatic tyre, resilient means bearing upon the soil-gripping elements to displace said elements outwardly from the periphery of the pneumatic tyre, stops on the supporting means to limit the outward displacement of the soil-gripping elements from the pneumatic tyre, a driving element secured to and projecting from the traction wheel, coupling means on the supporting means engageable with the driving element to positively couple the supporting means with the traction wheel, adjustable stop means mounted in stationary position and releasably engageable with the coupling means to arrest rotary movement of and hold the supporting means and the soil-gripping elements against rotation and to maintain the coupling means in inactive position, and means for impelling the coupling means after release of the same by the adjustable stop means into active position for engagement with the driving element.

ERIC WILLIAM WHITE.